(12) United States Patent
Zhang

(10) Patent No.: US 8,683,632 B2
(45) Date of Patent: Apr. 1, 2014

(54) INTERNAL VALVE AND METHODS OF USE FOR INFLATABLE OBJECTS

(76) Inventor: Zhengping Zhang, Sterling, VA (US)

( * ) Notice: Subject to any disclaimer, the term of this patent is extended or adjusted under 35 U.S.C. 154(b) by 1719 days.

(21) Appl. No.: 11/826,226

(22) Filed: Jul. 13, 2007

(65) Prior Publication Data

US 2009/0014072 A1 Jan. 15, 2009

(51) Int. Cl.
*A47C 27/10* (2006.01)
(52) U.S. Cl.
USPC ............. 5/710; 5/706; 5/713; 5/711; 5/655.3; 5/654
(58) Field of Classification Search
USPC .......... 5/706, 710, 713, 711, 655.3, 654, 644; 137/223, 224, 225, 527, 527.8, 855, 137/852
See application file for complete search history.

(56) References Cited

U.S. PATENT DOCUMENTS

| | | | |
|---|---|---|---|
| 1,382,531 A * | 6/1921 | Newborn | ........................... 5/706 |
| 2,839,073 A | 7/1958 | Marsh | |
| 2,997,100 A | 8/1961 | Morris | |
| 3,583,008 A | 6/1971 | Edwards | |
| 3,978,530 A | 9/1976 | Amarantos | |
| 4,541,135 A | 9/1985 | Karpov | |
| 5,794,288 A | 8/1998 | Soltani | |
| 5,947,563 A | 9/1999 | Klimenko | |
| 6,089,668 A | 7/2000 | Peterson | |
| 6,152,530 A | 11/2000 | Hsu | |
| 6,161,902 A | 12/2000 | Lieberman | |
| 6,196,260 B1 | 3/2001 | Pekar | |
| 6,328,385 B1 | 12/2001 | Lau | |
| 6,418,579 B2 | 7/2002 | Perez | |
| 6,671,910 B2 | 1/2004 | Hsu | |
| 6,996,867 B2 | 2/2006 | Boso | |
| 2003/0145888 A1 * | 8/2003 | Lin | ................................ 137/223 |
| 2004/0226101 A1 * | 11/2004 | Lin et al. | ............................ 5/710 |

* cited by examiner

*Primary Examiner* — Peter M Cuomo
*Assistant Examiner* — David E Sosnowski

(57) ABSTRACT

An internal valve (10, 10' or 10") and its methods of use for stabilizing and reinforcing inflatable objects are disclosed. The internal valve is a novel, simple modification to conventional check valves with the addition of a discharging means (14, 22 or 28)for external control. An internal supplemental chamber comprises one or more partitions that are secured, directly or by I-beams (40'), to main chamber's walls (40) of an inflatable object and stretched when the main chamber is inflated. With the internal valve as the passage to and from the main chamber, the enclosed or isolated supplemental chamber (30, 30', 32, 34, 36 or 38) functions as a stabilizing or reinforcing component. A plurality of chambers 36 can form cylinder beams for an inflatable mattress.

5 Claims, 2 Drawing Sheets

INTERNAL VALVE AND METHODS OF USE FOR INFLATABLE OBJECTS

CROSS-REFERENCE TO RELATED APPLICATIONS

Not Applicable

FEDERALLY SPONSORED RESEARCH

Not Applicable

BACKGROUND OF THE INVENTION

1. Field of Invention

This invention generally relates to valves for inflatable objects, specifically to a novel modification to conventional check valves and its methods of use for the purpose of improving the stability and style of inflatable objects.

2. Prior Art

Inflatable products are typically fashioned from flexible polymer materials such as polyvinylchloride. As the strength of flexible polymer materials has improved, more inflatable products, including inflatable furniture, have become available. Inflatable products can be large, light, attractive and cheap; they can be readily inflated and used or deflated and stored in very small spaces; and they can be easily cleaned.

Inflatable objects are generally somewhat balloon-like. Their stiffness and bounciness depend partly on their level of inflation and their configuration. While the shapes of their component sheet elements and their internal structures establish their overall shapes or contours, inflatable objects, when inflated, tend to have surfaces that bulge outwards. Furthermore, because the air inside inflatable objects is substantially movable and compressible, external pressure can easily distort their shapes by forcing the air in edge or corner regions to flow away and redistribute. This causes inflatable objects to be structurally unstable when used as support systems such as furniture. For example, when weight is applied at an edge of an inflatable chair, the side of the chair tends to distort. Such a distortion can cause a person to slip from the seating surface, increasing the person's risk of injury. This problem becomes more significant as the height of the support system increases.

In the prior art, this problem was addressed by employing extra stabilizing and reinforcing tubes or independent chambers, as taught in U.S. Pat. No. 5,947,563 (1999), U.S. Pat. No. 6,089,668 (2000), U.S. Pat. No. 6,152,530 (2000), U.S. Pat. No. 6,161,902 (2000), U.S. Pat. No. 6,328,385B1 (2001) and U.S. Pat. No. 6,671,910B2 (2004). However, these tubes or chambers need to be inflated through multiple external conventional valves. Unfortunately, the extra valves may cause poor air retention if cheap conventional valves are used, as usually do, in such applications as inflatable furniture. Yet some designs also require manual assembly of independent parts. Furthermore, a single built-in pump cannot work without a complex air distribution system. To enable the use of a single built-in pump, U.S. Pat. No. 6,996,867B2 (2006) proposed a different approach for an air mattress. The stabilizing and reinforcing components of the air mattress are only in fluid communication with the main chamber through small air passages or holes. The size and configuration of such passages can slow air flowing out of the stabilizing and reinforcing chambers and, therefore, increase the mattress' stability. However, since the air loss can only be slowed rather than eliminated, the design cannot provide stability under constant pressures or forces. Furthermore, all of the chambers in the design have the same air pressure although it can be desirable to have a higher pressure in the stabilizing or reinforcing chambers for stability and a lower pressure in the main support chamber for comfort. In all the approaches described above, stabilizing or reinforcing parts most likely add additional profiles that can make inflatable products less attractive.

Conventional check or one-way valves and their methods of use are well known in the prior art. They basically have no means of discharging air and are used internally in fluid control systems or air pump systems of inflatable mattresses, as taught in U.S. Pat. No. 2,997,100 (1961), U.S. Pat. No. 3,583,008 (1971), U.S. Pat. No. 3,978,530 (1976), U.S. Pat. No. 5,794,288 (1998), U.S. Pat. No. 6,196,260B1 (2001) and U.S. Pat. No. 6,418,579B2 (2002). The check valves in these applications prevent air from flowing back to main chambers but the air can still escape through other passages or by other discharging means. Check valves are also used externally with standard valves for inflatable objects, when being integrated at the inner end of the tube of the external valves, as taught in U.S. Pat. No. 2,839,073 (1958). In this case discharging can be done with direct external interventions, such as insertion of a slender rod from outside, to open the check valves.

The use of conventional check valves presented in U.S. Pat. No. 4,541,135 (1985) should also be noted. As in the prior art described above, a separate inflatable tube is employed around the side of an air mattress and, when inflated, provides support for the mattress. The air mattress and the tube are inflated also through separate external valves. The support tube is further divided into one main chamber and two or four independent sub-chambers to increase its stability while still to be inflated through one external valve. The air forced through the external valve of the tube into the main chamber inflates these sub-chambers individually and simultaneously through four conventional check valves that are installed internally and close to the external valve. However, unlike the chambers described in the prior art, these sub-chambers may have no other air passages or discharging means. Unfortunately, to deflate the sub-chambers, one must insert a long instrument through the external valve to open each of the check valves.

Thus, it is desirable in the art to have a simple device that:
(a) can improve the structural stability of inflatable objects without changing their basic designs;
(b) can be invisible from the outside of inflatable objects;
(c) can be installed at any desired location inside inflatable objects;
(d) can enable inflatable objects to be conveniently inflated by one standard built-in pump;
(e) can avoid the poor air retention of extra external valves;
(f) can enable inflatable objects to have internal partitions with different pressures;
(g) can function without external instruments; and
(h) can significantly reduce the roundness of inflatable objects' edges and corners.

Accordingly, these are the objects and advantages of the present invention. Further objects and advantages will become apparent after consideration of the following detailed description and drawings.

SUMMARY OF THE INVENTION

This invention presents an internal valve for inflatable objects and methods of use thereof to address the issues or problems in the prior art as described above. In accordance with several embodiments, the internal valve comprises: 1) a conventional check valve, and 2) a discharging means for external control. The internal valve is a novel and simple modification to conventional check valves with the addition or integration of the discharging means for external control. The internal valve provides the only passage from a main chamber to a separate stabilizing or reinforcing supplemental chamber. Air inflates the main chamber through a standard valve and then, after the pressure inside reaches a certain level, inflates the supplemental chamber. The supplemental chamber is secured such that the air pressure in the main chamber cannot significantly reduce or depress its volume. Thus this prevents the premature occurrence of a balance between both sides of the internal valve before the supplemental chamber fills up. As a result, the air in the supplemental chamber cannot flow back to the main chamber, even under external pressure, and therefore the reinforced supplemental chamber strengthens the inflatable objects. Furthermore, the supplemental chamber can retain a higher air pressure after the main chamber slightly deflates.

The methods of use of the internal valve and conventional check valves have the following fundamental differences. The internal valve 1) can facilitate both inflation and deflation without the use of additional instruments; 2) is designed for an enclosed or isolated internal chamber instead of an open chamber in a flow control system; 3) can be installed to such an isolated chamber at any desired place inside a main chamber rather than only at places near a standard valve of the main chamber; and 4) is designed for use with supplemental chambers for stabilization and reinforcement that can be invisible from the outside of an inflatable object.

DRAWINGS—FIGURES

DETAILED DESCRIPTION—PREFERRED EMBODIMENTS—FIGS. 1-3

Figure 1:
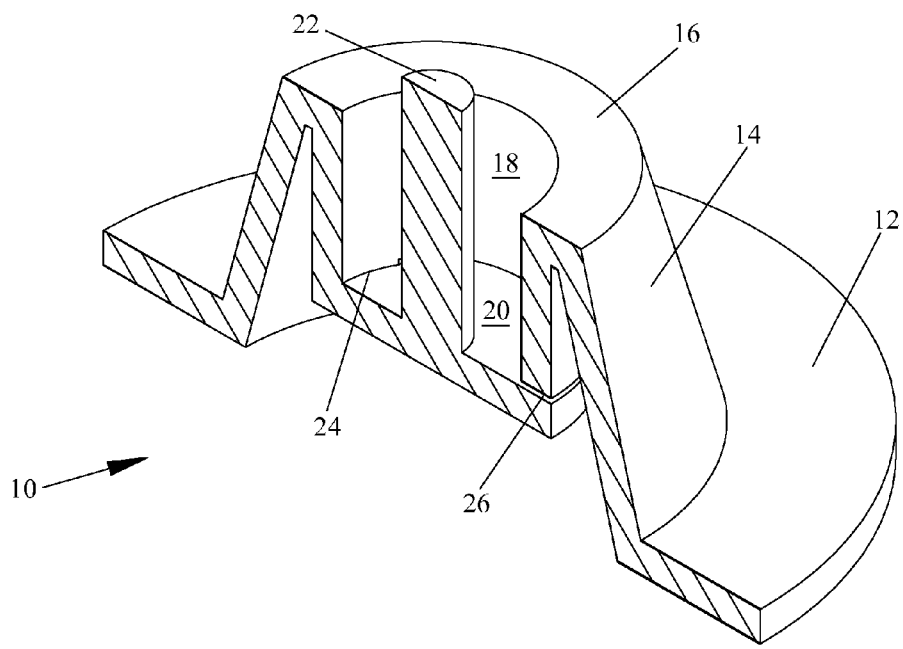
FIG. 1 is a perspective sectional view of an internal valve according to the invention.

A preferred embodiment of the internal valve of the present invention is illustrated in FIG. 1. An internal valve 10 comprises an annular valve seat 12, a conical wall or diaphragm 14, an annular connection 16, a tube or tubular member 18, a check flap 20 and a discharging cylinder or finger 22. Wall 14 extends upwardly from seat 12 and connects with the top of tube 18 through connection 16. The body of the tube extends downwardly. The flap is connected with the bottom of the tube partially by a hinge 24 and functions as a check valve. The flap is preferably formed from the bottom wall of tube 18 that is partially severed from the body by a shearing cut 26, as known in the art. One end of finger 22 is secured substantially to the center of flap 20 inside the tube and the other end is extended above the top surface of connection 16 outside the tube. Therefore, the flap moves to an open position if finger 26 is pushed down. Valve 10 is preferably made of polymer material such as polyvinyl chloride (PVC).

Valve 10 is used for an enclosed chamber inside an inflatable object's main chamber, as described in the following operation section. When used, seat 12 seals and reinforces the opening of the internal chamber to the main chamber. The air pressure differential between both chambers would determine whether flap 20 is open or closed. If the pressure in the main chamber is higher, the air from the main chamber flows into the internal chamber through the opening. Otherwise, the air pressure in the internal chamber acts uniformly on the flap to keep it closed. An external pressure or force on the internal chamber increases the air pressure inside and therefore closes the valve tightly. As a result, air loss from the internal chamber does not occur under external pressure or force. Wall 14 and finger 22 can be felt from the outside of the inflatable object after the main chamber is deflated. Then by keeping the finger pushed down the internal chamber can be deflated. Alternatively, by slightly squeezing or pinching wall 14, the internal chamber can also be deflated if the valve is made of a compressible or flexible material. Such a pinch distorts the shape of tube 18, disengages it from close contact with flap 20, and therefore creates a gap for air to escape. Furthermore, instructions and illustrations could be printed at a proper location on the outer surface of the inflatable object to help users locate and operate the internal valve.

Figure 2:
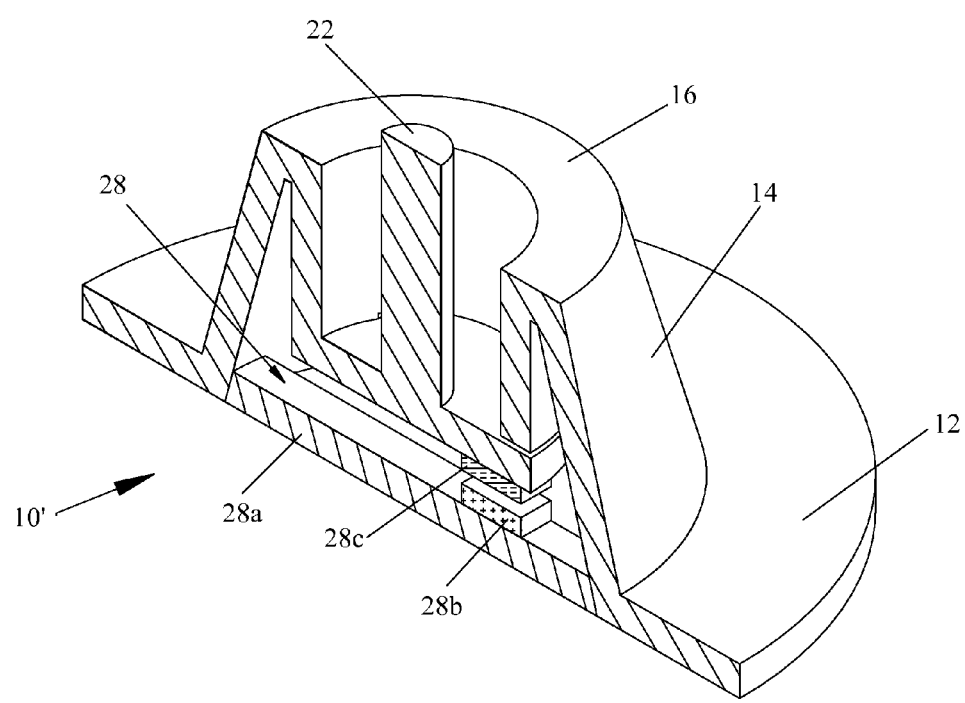
FIG. 2 is a perspective sectional view of an internal valve with a releasable fastening mechanism according to the invention.

An alternative embodiment to the preferred embodiment is illustrated in FIG. 2. In addition to the same components and configurations as valve 10 of the preferred embodiment, an internal valve 10' in this alternative embodiment further comprises a device with a hook-loop fastener 28 including a strip 28a, a hook part 28b secured to the strip, and a loop part 28c secured to flap 20. The loop part is positioned near the flap edge opposite hinge 24 outside tube 18. Strip 28a is made of less flexible material and secured to wall 14 at the ends beneath flap 20 such that part 28b is opposite part 28c with a proper gap between when the flap closes the valve. The fastening strength is chosen such that the hook-loop fastener is open when flap 20 is closed while, after part 28c is pushed down by pressing finger 22 to contact part 28b, the hook-loop fastener can be kept close against a higher air pressure in the internal chamber up to a predetermined level. Operation of valve 10' is almost identical to that of valve 10 except that flap 20 can be kept open by fastener 28 with no external interventions when the air pressure differential between the internal chamber and the main chamber is relatively weak. Therefore valve 10' is more convenient than valve 10 for the discharge. Alternatively other two-piece releasable fasteners, such as a tiny magnet and a piece of iron, can replace the hook and loop fastener.

Figure 3:
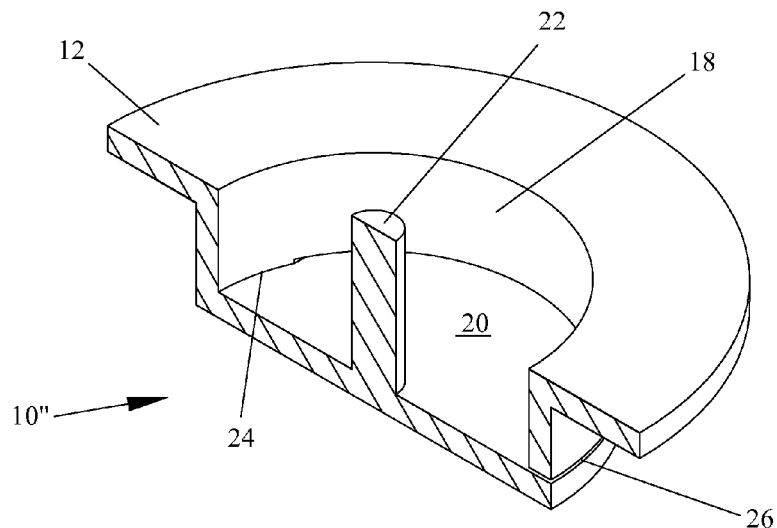
FIG. 3 is a perspective sectional view of an internal valve in a different embodiment according to the invention.

Another alternative embodiment to the preferred embodiment is shown in FIG. 3. An internal valve 10" in this alternative embodiment comprises the same components as valve 10 presented in the preferred embodiment except that it does not have conical wall 14. Valve 10" is a simplified version of valve 10 where seat 12 directly emerges with connection 16 without wall 14. When valve 10" is used for the internal chamber as described above, tube 18 is inside the chamber and seat 12 seals the opening of the chamber. Operation of valve 10" is identical to that of valve 10 except that valve 10" does not have the squeezing or pinching option.

DETAILED DESCRIPTION—METHODS OF USE—FIGS. 4A-E

The methods of use for the internal valve are integral components of the present invention. Some of them are demonstrated through the following embodiments.

Figure 4A:
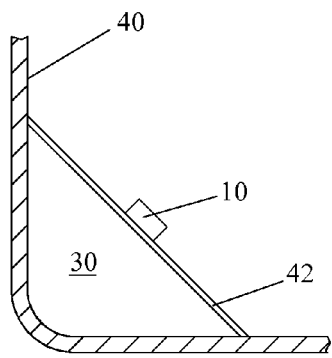
FIG. 4A is an illustration of the methods of use with internal edge or corner reinforcing chambers according to the invention.

An embodiment for the methods of use is illustrated in FIG. 4A, which shows how to strengthen the edges or corners of an inflatable object with internal valve 10, 10' or 10". The sketch depicts a sectional view of an edge portion 40 of an inflatable object with substantially perpendicular walls, an enclosed stabilizing and reinforcing chamber 30, an internal valve 10, and the configuration of these components. Other internal structures of the main chamber, such as restriction beams known in the art, are not shown. Chamber 30 is partitioned and enclosed inside a main chamber of the inflatable object and in fluid communication with the main chamber only through valve 10. Chamber 30 is formed by sealing the edge portion with a partition 42 that extends and is secured to all the walls of the main chamber around the edge. The dimensions of partition 42 are predetermined such that it can function as a restriction beam or web for the walls after the inflatable object is inflated. The partition is preferably made of a sheet of the same material as the walls' and is connected air-tightly with the inner surfaces of the walls by welding or other methods as known in the art. There are two walls along the edge and two walls substantially perpendicular to the edge at the ends (not shown). An opening to chamber 30 is made in partition 42 and sealed with valve 10. The valve is installed such that air with higher pressure can flow from the main chamber into chamber 30. After the air pressure in the main chamber reaches a certain level, the air starts to flow through valve 10 and inflate chamber 30. When the air pressure inside chamber 30 builds up and reaches the same pressure as in the main chamber, the inflation process stops. Partition 42 confines air inside chamber 30. As a result, the edge region is strengthened as the firmness of chamber 30 increases after being inflated. Furthermore, as a restriction beam for the walls, the partition helps balance the outward air pressure on the wall surfaces, weakening their bent surface tension, and therefore reducing roundness at the edge. If desired, the air pressure inside chamber 30 can be higher than that in the main chamber by first inflating the chambers fully and then deflating the main chamber slightly or partially through a standard external valve (not shown).

Alternatively, either end of chamber 30 may be bordered by an additional sheet of material (not shown), instead of the sidewalls of the main chamber as described above. The additional sheet is substantially of size of the triangular cross-section of the ends when chamber 30 is inflated. The sheet's periphery is connected and sealed with the edge walls of the main chamber and the side of partition 42. Furthermore, the method of use illustrated in FIG. 4A can be used to strengthen more than one edge. By connecting partitions 42 at their intersections, two, three or four such stabilizing and reinforcing chambers 30 can form an L-shaped, U-shaped or rectangular chamber with a single valve 10, 10' or 10" installed.

Figure 4B:
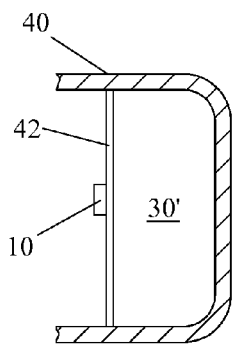
FIG. 4B is an illustration of the methods of use with internal side reinforcing chambers according to the invention.

Another embodiment for the methods of use is illustrated in FIG. 4B, which shows how to reinforce a side of an inflatable object with the internal valve 10, 10' or 10". The sketch illustrates a sectional view of a side portion 40 of an inflatable object with two (top and bottom) substantially parallel walls, a reinforcing chamber 30' enclosed in a main chamber of the inflatable object, an internal valve 10, and the configuration of these components. Other internal structures of the main chamber, such as restriction beams known in the art, are not shown. Chamber 30' is formed by an internal partition 42 that extends and connects air-tightly to the top, bottom, and opposite sidewalls (not shown) of the main chamber. The dimensions of partition 42 are predetermined such that it can function as a restriction beam or web for the top, bottom, and opposite sides/walls after the object is inflated. Chamber 30' is in fluid communication with the main chamber only through valve 10. The reinforcing process and function of chamber 30' are similar to those of chamber 30 described in the previous embodiment. Furthermore, if desired, more than one such side reinforcing chambers can be used to reinforce more sides of the inflatable object. By connecting partitions 42 at their intersections, two, three or four such reinforcing chambers 30' can form an L-shaped, U-shaped or rectangular chamber with a single valve 10, 10' or 10" installed.

Figure 4C:
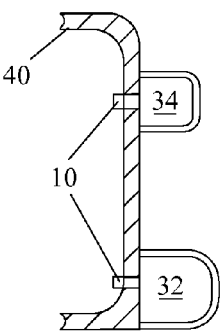
FIG. 4C is an illustration of the methods of use with external stabilizing and reinforcing chambers according to the invention.

Another embodiment for the methods of use is illustrated in FIG. 4C, which shows how to apply the internal valve 10, 10' or 10" to external stabilizing and reinforcing chambers. The sketch illustrates a sectional view of a side portion 40 of an inflatable object with top, bottom, and side walls, an external stabilizing chamber or tube 32 near the bottom, an external reinforcing chamber or tube 34 extended on and around a sidewall, two internal valves 10, and the configuration of the parts. Chamber 32 or 34 is enclosed by the sidewall and its own wall. Such a chamber is made of a rectangular PVC sheet with two longitudinal edges that are connected air-tightly to the sidewall and two end edges that are sealed. An opening to chamber 32 or 34 is made in the sidewall and sealed by valve 10. The valve is installed such that air with higher pressure in the main chamber can flow into the external chamber. The stabilizing and reinforcing chambers can be extended around the inflatable object as L-shaped, U-shaped or substantially rectangular chambers.

Figure 4D:
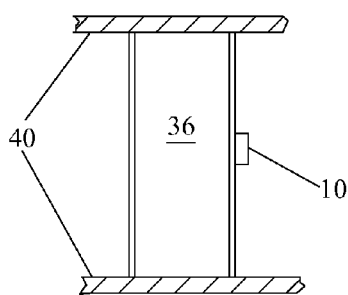
FIG. 4D is an illustration of the methods of use for the formation of block beams according to the invention.

Another embodiment for the methods of use is illustrated in FIG. 4D, which shows how to use the internal valve to build block or cylinder beams for an inflatable object. The sketch illustrates a sectional view of a middle portion 40 of an inflatable object with opposite walls, an internally enclosed cylinder chamber 36, an internal valve 10, and the configuration of these components. Chamber 36 is enclosed by the opposite walls and a cylindrical wall. The cylindrical wall is made of a rectangular PVC sheet with two opposite edges that are welded air-tightly together. The open ends of the cylindrical wall, formed by the other two opposite edges of the sheet, are air-tightly connected and secured to the opposite walls. Valve 10 is installed in the cylindrical wall. After the air pressure in the main chamber reaches a certain level, the walls of chamber 36 start to stretch out. Then the air starts to flow through valve 10 and inflate chamber 36. The air in chamber 36 cannot escape under external force or pressure because of the one-way nature of the valve 10. Thus chamber 36 provides the opposite walls stronger support against pressure than the main chamber does. The cylindrical wall can also function as a restriction beam to the opposite walls. Therefore, a novel inflatable mattress can be build by replacing the conventional beams in an air mattress with a plurality of chambers 36 installed between the top and bottom walls and evenly spaced from one another. Such an inflatable mattress can avoid bottoming after the block beams are inflated.

Figure 4E:
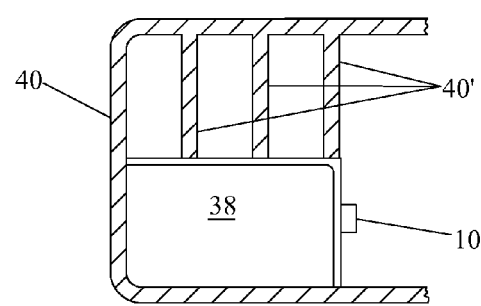
FIG. 4E is an illustration of the methods of use in combination with I-beams according to the invention.

Another embodiment for the methods of use is illustrated in FIG. 4E, which shows how to install or utilize internal stabilizing or reinforcing chambers with walls that would not have a strong support. The sketch illustrates a sectional view of a side portion 40 of an inflatable object, an internally enclosed chamber 38, an internal valve 10, I-beams 40' and the configuration of these components. Unlike chamber 30' in a previous embodiment as illustrated in FIG. 4B, chamber 38 has two partition walls and both are not directly or completely secured to the object walls. In order to have the partition walls of chamber 38 stretched when the main chamber is inflated, I-beams 40' are used to secure at least the partition wall with a larger surface area, the top partition wall in this case, to the object walls. Then chamber 38 can function as a stabilizing or reinforcing chamber as described above. This approach can generally work in many different configurations.

Similarly, the method of use for the internal valve as described above can be used to construct a taller air mattress with a double layer chamber structure. An intermediate partition sheet or wall substantially parallels the top and bottom walls of the mattress and completely separates the top and bottom into two chambers. A standard valve is installed to the top chamber. The top is in fluid communication with the bottom only through an internal valve that seals an opening in the intermediate partition. Structurally the top, bottom, and intermediate partition in the mattress are very similar to the main chamber, reinforcing chamber 30' and partition 42 as illustrated in FIG. 4B. However, unlike partition 42, the intermediate partition wall needs to be further secured because of its large surface area. The intermediate partition can be secured to the top wall by beams, such as I-beams 40'. Therefore, as described above, the bottom chamber can maintain a higher pressure for support while the top chamber maintains a lower pressure for comfort. Furthermore, the soft top on hard bottom is also a stabilized structure.

The stabilizing and reinforcing chambers as described above in FIGS. 4A-E can be deflated as follows. First deflate the corresponding main chambers of the inflatable objects through external standard or exhaust valves (not shown). Then, locate the internal valves (10, 10' or 10") by feeling or touching over the flexible walls of the inflatable objects. After reaching the internal valves, operate the discharging controls (finger 22 and fastener 28) to open the valves. While keeping the valves open, press the chambers to push the air out into the main chamber, frequently re-deflating the latter if necessary, until the chambers are fully deflated. For some applications, such as indoor inflatable furniture that intends to be used over a period of time, the deflation procedure is not operated very often. However, if accelerated deflation is desirable, an external exhaust valve (not shown) can be installed as known in the art.

CONCLUSION, RAMIFICATIONS, AND SCOPE

A number of advantages of the present invention, from the description above, is evident:

It is a simple, general and effective method for stabilizing and reinforcing inflatable objects.
It functions, without external instruments, and thus can be installed at any desired location inside inflatable objects.
It enables such stabilized and reinforced inflatable objects to be conveniently inflated by one standard built-in pump.
It can be invisible from the outside of inflatable objects and does not change basic designs of the inflatable objects.
It enables inflatable objects to have internal partitions with different pressures as desired.
It can significantly reduce the roundness of inflatable objects' edges and corners and make their contours to look more stylish or rigid.
It enhances air retention in the stabilizing and reinforcing chambers as their openings and internal valves are enclosed inside main chambers of inflatable objects.

While the above description contains many specificities, the specificities should not be construed as limitations on the scope of the invention, but as exemplifications of the presently preferred embodiments thereof Many other ramifications and variations are possible within the teachings of the various embodiments. For example, 1) the methods of use can be applied in combination; 2) a variety of different designs for the check valve can be used; 3) a variety of different mechanisms or designs for the external control of the check valve can be used; and 4) the internal valve and its methods of use are also applicable to inflatable objects with fluid rather than air. Thus the scope of the invention should be determined not by the examples given but by the appended claims and their legal equivalents.

I claim:

1. An internal valve for being used only inside an inflatable object having at least a main chamber and a supplemental chamber wherein said main chamber is directly in fluid communication with the environment, said supplemental chamber is only indirectly in fluid communication with the environment through an opening to said main chamber, and said internal valve seals said opening, comprising:
   (a) a check valve for inflatable objects, and
   (b) a discharging means for externally controlling said check valve,
   whereby a fluid can flow into said supplemental chamber from said main chamber through said check valve while said fluid can be confined in said supplement chamber by said check valve and released with said discharging means.

2. The internal valve of claim 1 wherein said check valve is made of resilient plastic material, including a tube forming the fluid passage, a check flap hinging at one end of said tube, and a flange joining or connecting either indirectly, through a conical wall enclosing substantially coaxially said tube therein, or directly to said tube and extending radiantly to seal said opening, and wherein said discharging means includes said conical wall or the other end of said tube,
   whereby, after said main chamber is deflated, said supplemental chamber can be deflated by slightly squeezing or pinching said conical wall or said tube from the outside to distort the shape of said tube, disengage it from close contact with said check flap, and create a gap for fluid to escape.

3. The internal valve of claim 1, including a tube forming the fluid passage, a check flap hinging at one end of said tube, and a flange joining or connecting either indirectly, through a conical wall enclosing substantially coaxially said tube therein, or directly to said tube and extending radiantly to seal said opening and wherein said discharging means includes a solid cylinder or bar being secured at one end thereof to said check flap inside said tube and extending at the other end thereof outside said tube,
   whereby, after said main chamber is deflated, said supplemental chamber can be deflated by keeping said cylinder or bar pushed down.

4. The internal valve of claim 3 wherein said discharging means further includes a releasable fastening means for keeping said check valve open against higher fluid pressure in said supplemental chamber up to a predetermined level.

5. The internal valve of claim 4 wherein said fastening means includes a hook-loop fastener and a supporting means for securing one half of said fastener to keep a predetermined distance from the other half of said fastener secured to said check flap.

* * * * *